UNITED STATES PATENT OFFICE.

JAMES HENDERSON, OF BELLEFONTE, PENNSYLVANIA.

PROCESS OF HARDENING FIRE-BRICK.

SPECIFICATION forming part of Letters Patent No. 279,161, dated June 12, 1883.

Application filed November 18, 1882. (No specimens.)

*To all whom it may concern:*

Be it known that I, JAMES HENDERSON, of Bellefonte, county of Centre, State of Pennsylvania, have invented a new and useful Process of Hardening Fire-Brick, of which the following is such full, clear, and exact description as will enable others skilled in the art to which it most nearly appertains to make and use the same.

This my invention is based on the discovery that fire-brick furnace-linings and similar hard and refractory substances may be protected from the injurious effects of the first heat of a high temperature and thoroughly hardened by coating the surface with certain substances which hold the same together until they become thoroughly set and hardened.

I have found that fire-brick and furnace-linings made of the compounds of alumina, silica, and water, and of lime, silica, and water, (described and set forth in Letters Patent of the United States granted to me on or about the 26th day of September, A. D. 1882,) when first subjected to high temperatures are extremely friable; but if kept from contact for some time and subjected to high temperatures they become set and hardened.

It is the more direct purpose of my invention to protect the surfaces of articles made of the compounds set forth in my patents of September 26, A. D. 1882, and October 17, A. D. 1882; but it may be practiced with other substances.

One part of fine sand or quartz is melted with four parts of potash, or eight parts of crystallized carbonate of soda, or three parts of dry carbonate of soda, and dissolved in water. To this is added fire-clay or powdered silica and alumina, to give two parts of silica and one part of alumina to the one part of silica already in the above-described solution, and to this I add two parts of lime, by weight, and are thoroughly mixed together; or a solution of common salt or chloride of sodium and water may be used with the powdered silica, fire-clay, and lime, or with potter's clay without lime; or a solution of silica and soda may be used without the fire-clay and lime; or a solution of common salt and water without other substances, or calcined feldspar may be crushed and mixed with water to a thin paste or solution; or a solution of about forty parts of white lead, thirty-five parts of Cornish stone, twelve parts of flint, and four parts of crystal or flint glass crushed to a fine powder and mixed with water will answer.

Any of the above-described compounds or solutions may be used to coat the surface of the fire-brick or furnace-lining or other surface it is desired to protect, and will be found to completely protect the surface from abrasions during the time of the first high temperatures to which it may be subjected, and the surface will thereafter be found in a hard and compact condition.

I do not claim herein the compounds and solutions herein set forth, nor their application to surfaces of earthenware, china, and artificial stone, as they have for a long time been used for such purposes; but What I do claim, and desire to secure by Letters Patent, is—

The process herein described of hardening fire-brick, consisting of coating them with a glaze and subjecting them to high temperatures and burning them, as specified and set forth.

JAMES HENDERSON.

Witnesses:
WILBUR F. REEDER,
JOHN G. COWPER.